(12) United States Patent
Miyazaki et al.

(10) Patent No.: US 7,098,941 B2
(45) Date of Patent: Aug. 29, 2006

(54) DIGITAL CAMERA HAVING A BUILT-IN PRINTER

(75) Inventors: Takao Miyazaki, Saitama (JP); Seisuke Muroki, Saitama (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 939 days.

(21) Appl. No.: 10/201,699

(22) Filed: Jul. 24, 2002

(65) Prior Publication Data

US 2003/0025795 A1    Feb. 6, 2003

(30) Foreign Application Priority Data

Jul. 31, 2001    (JP)    ............... 2001-230992

(51) Int. Cl.
*H04N 5/225*    (2006.01)
(52) U.S. Cl. .............. 348/207.2; 358/302; 358/472
(58) Field of Classification Search ............. 348/207.2; 358/472, 302; 355/84; 396/33, 39, 30
See application file for complete search history.

(56) References Cited

U.S. PATENT DOCUMENTS

| | | | | |
|---|---|---|---|---|
| 5,047,870 A | * | 9/1991 | Filo | ............... 358/472 |
| 5,822,637 A | * | 10/1998 | Stephenson | ............... 396/30 |
| 6,094,282 A | * | 7/2000 | Hoda et al. | ............... 358/296 |
| 6,628,333 B1 | * | 9/2003 | Gowda et al. | ............... 348/207.2 |
| 6,750,979 B1 | * | 6/2004 | Kobayashi et al. | ............... 348/207.2 |
| 6,791,604 B1 | * | 9/2004 | Lama et al. | ............... 348/207.2 |
| 6,909,456 B1 | * | 6/2005 | Sasaki | ............... 348/207.2 |
| 6,930,717 B1 | * | 8/2005 | Kobayashi et al. | ............... 348/207.2 |
| 6,947,184 B1 | * | 9/2005 | Onishi et al. | ............... 358/472 |
| 6,952,272 B1 | * | 10/2005 | Sasaki | ............... 358/527 |
| 6,963,359 B1 | * | 11/2005 | Aosaki et al. | ............... 348/207.2 |
| 2005/0179731 A1 | * | 8/2005 | Omura et al. | ............... 347/50 |

* cited by examiner

*Primary Examiner*—Tuan Ho
*Assistant Examiner*—Jason Whipkey
(74) *Attorney, Agent, or Firm*—McGinn IP Law Group, PLLC

(57) ABSTRACT

An image recording surface of an exposed instant film is held so as to face an optical head module. Read light (white light) emitted from a light source passes a transparent portion of a color-separation filter, a first mirror, a first graded-index-type optical fiber array, and a second mirror in order. Then, the read light is radiated toward an instant film from an opening of the optical head module. The second mirror is set to a read position where the read light is inclined by a predetermined angle relative to the instant film. The read light is reflected by the image recording surface of the instant film and enters a line-CCD sensor via a second graded-index-type optical fiber array. By moving the optical head module in a sub-scanning direction, it is possible to read an image from the instant film.

15 Claims, 9 Drawing Sheets

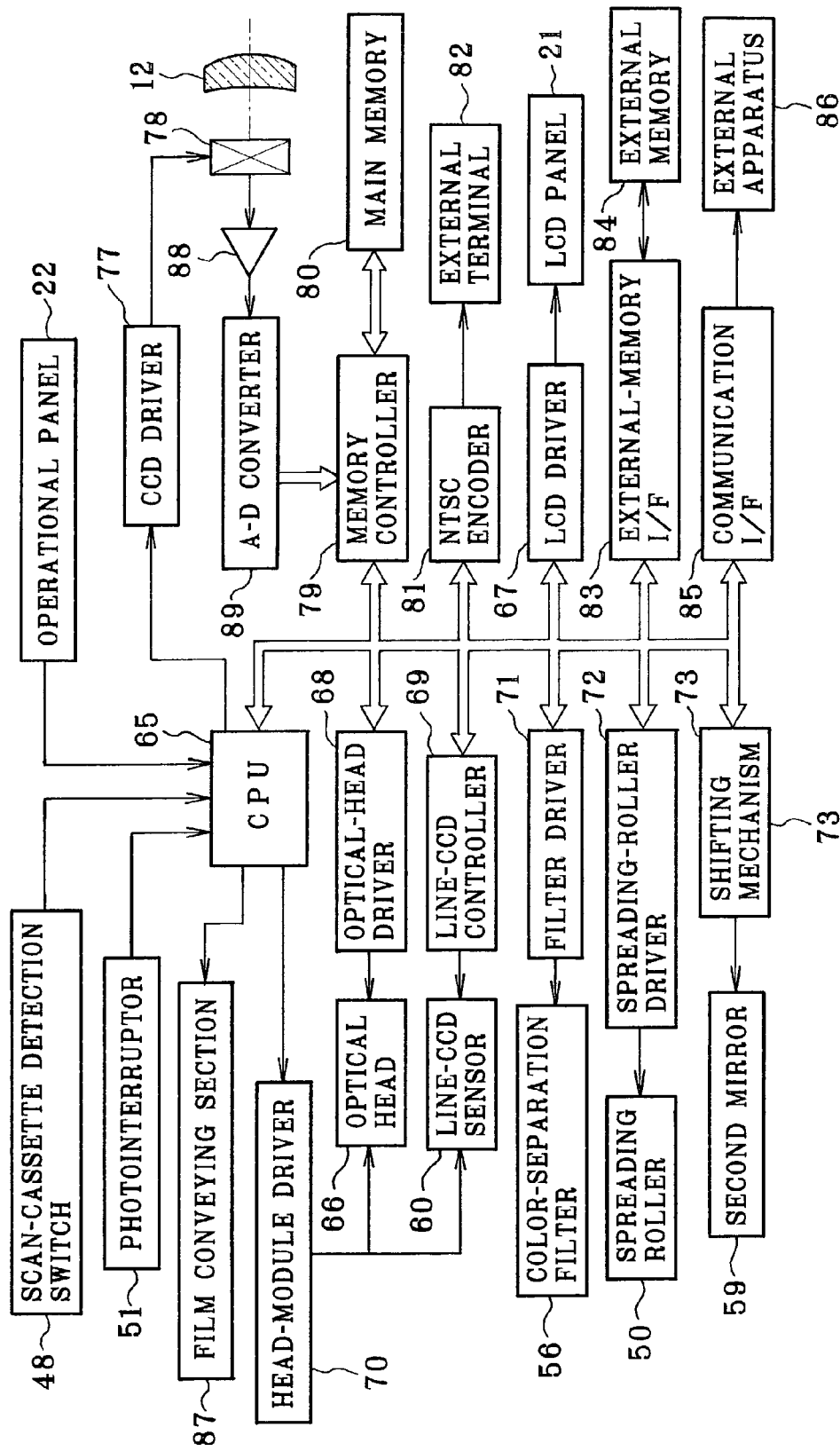

DIGITAL CAMERA HAVING A BUILT-IN PRINTER

BACKGROUND OF THE INVENTION

1. Field of the Invention

The present invention relates to a digital camera having a built-in printer in which a printing light is emitted to an instant film in accordance with image data, which is obtained by photographing a subject image, to perform hard copy of the image data.

2. Description of the Related Art

A digital camera utilizing a CCD image sensor and so forth is widely used. In the digital camera, an optical subject image is converted into an electronic image signal. Further, the electronic image signal is digitally converted for obtaining image data to be stored in a memory. Some of the digital cameras have a built-in printer to produce a photo print of the desired image data by means of hard copy. This image data is selected among the image data stored in the memory, and the hard copy thereof is performed on an instant film. The printer is provided with an optical head for emitting printing lights of respective colors of red(R), green(G) and blue(B). The optical head is disposed so as to confront a photosensitive surface of the instant film, and is moved on a parallel therewith. Upon selecting the desired image data for the hard copy and upon starting a print operation, the optical head performs an exposure in accordance with the image data, moving in a sub-scanning direction. The exposure is performed in a three-color frame-sequential manner to print a full-color image on the instant film.

In the above-described digital camera having the built-in printer, it is possible to easily perform the hard copy of the image data stored in the memory. However, even though the instant film on which the image is recorded by the hard copy exists, it is impossible to perform the hard copy of the same image again when the image data is erased from the memory.

SUMMARY OF THE INVENTION

In view of the foregoing, it is a primary object of the present invention to provide a digital camera having a built-in printer in which hard copy of an image is performed by reading the image from an image recording medium on which the image is already recorded.

It is a second object of the present invention to provide a digital camera having a built-in printer in which a scanner function may be added at low cost.

In order to achieve the above and other objects, the digital camera having the built-in printer according to the present invention comprises a medium holding member, a light emitting device, and an image reader. The medium holding member keeps the image recording medium, on which an image is already recorded, in a predetermined position of the digital camera. This medium is an exposed instant film, for instance. The light emitting device radiates a read light, moving on a parallel with an image recording surface of the medium. The image reader receives the read light reflected by the image recording surface to read the image recorded thereon.

By the way, the digital camera is loaded with a film cassette containing unexposed instant films. An optical head is moved on a parallel with an exposure surface of the unexposed instant film to emit a printing light thereto for exposing the instant film in accordance with image data. The exposed instant film passes between a pair of spreading rollers to spread developer so that the image is developed. After that, the developed instant film is discharged through a discharge mouth formed in a camera body of the digital camera. The optical head is preferable to be also used as the above-mentioned light emitting device.

Meanwhile, the image reader comprises a line CCD sensor and is preferable to be unified with the optical head. The above-mentioned medium holding member is a scan cassette having a similar shape with the film cassette. The scan cassette is loaded in the camera body instead of the film cassette when reading the image recorded on the image recording medium. At this time, the image recording medium is inserted through the discharge mouth to be drawn into the scan cassette by means of the spreading rollers, and the image recording surface thereof is set so as to face the optical head.

According to the digital camera of the present invention, hard copy of the image may be easily performed by reading the image from the image recording medium. In the digital camera of the present invention, the optical head for emitting the printing light is also used as a light source for reading the image. Further, the optical head is integrally provided with the line CCD sensor as the image reader. Thus, a scanner function may be added without increasing its size and at low cost.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 7 is a block diagram showing a circuit structure of the digital camera;

DETAILED DESCRIPTION OF THE PREFERRED EMBODIMENT(S)

Figure 1:
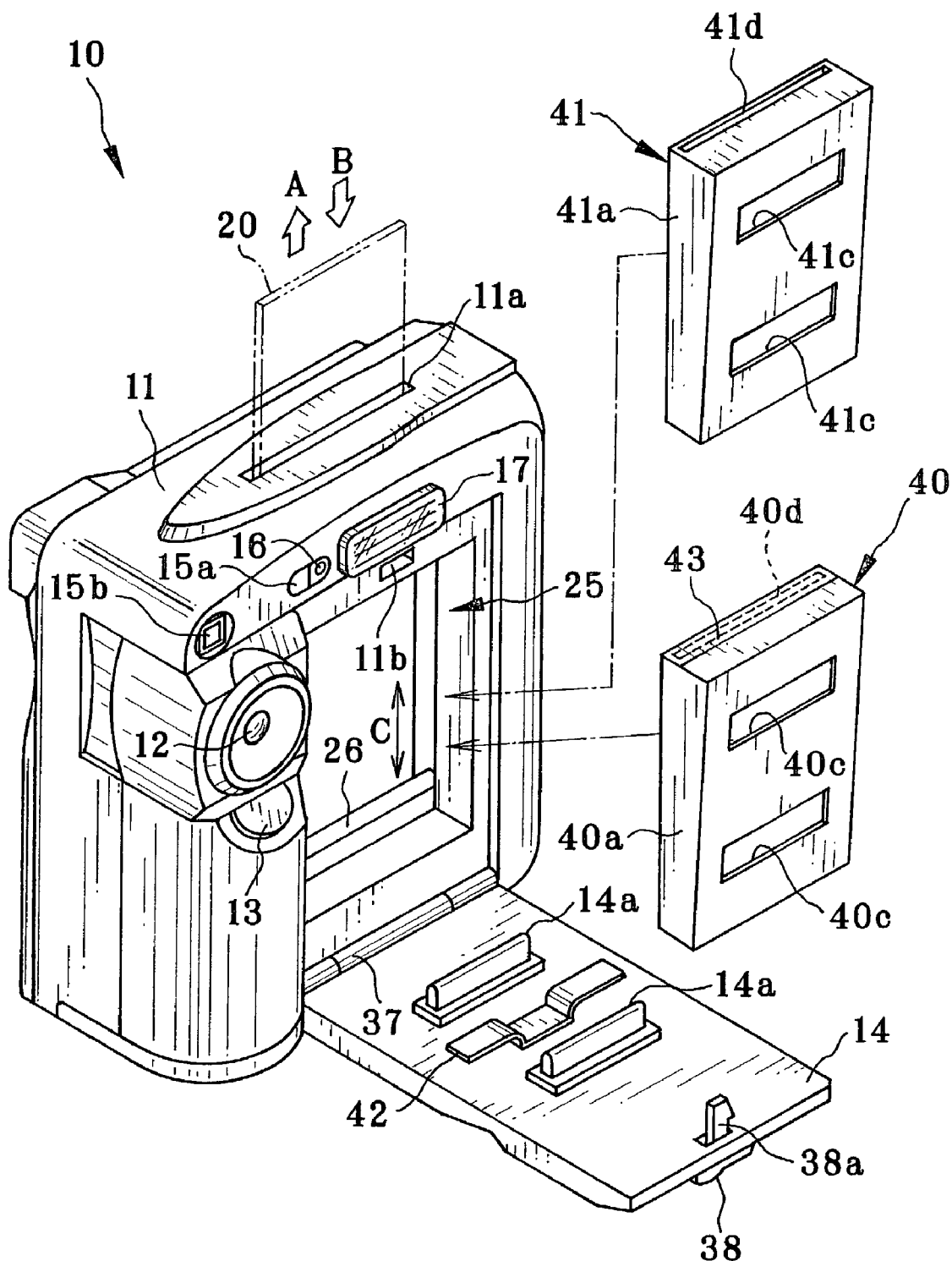
FIG. 1 is a front perspective view of a digital camera with a built-in printer according to the present invention.
Figure 2:
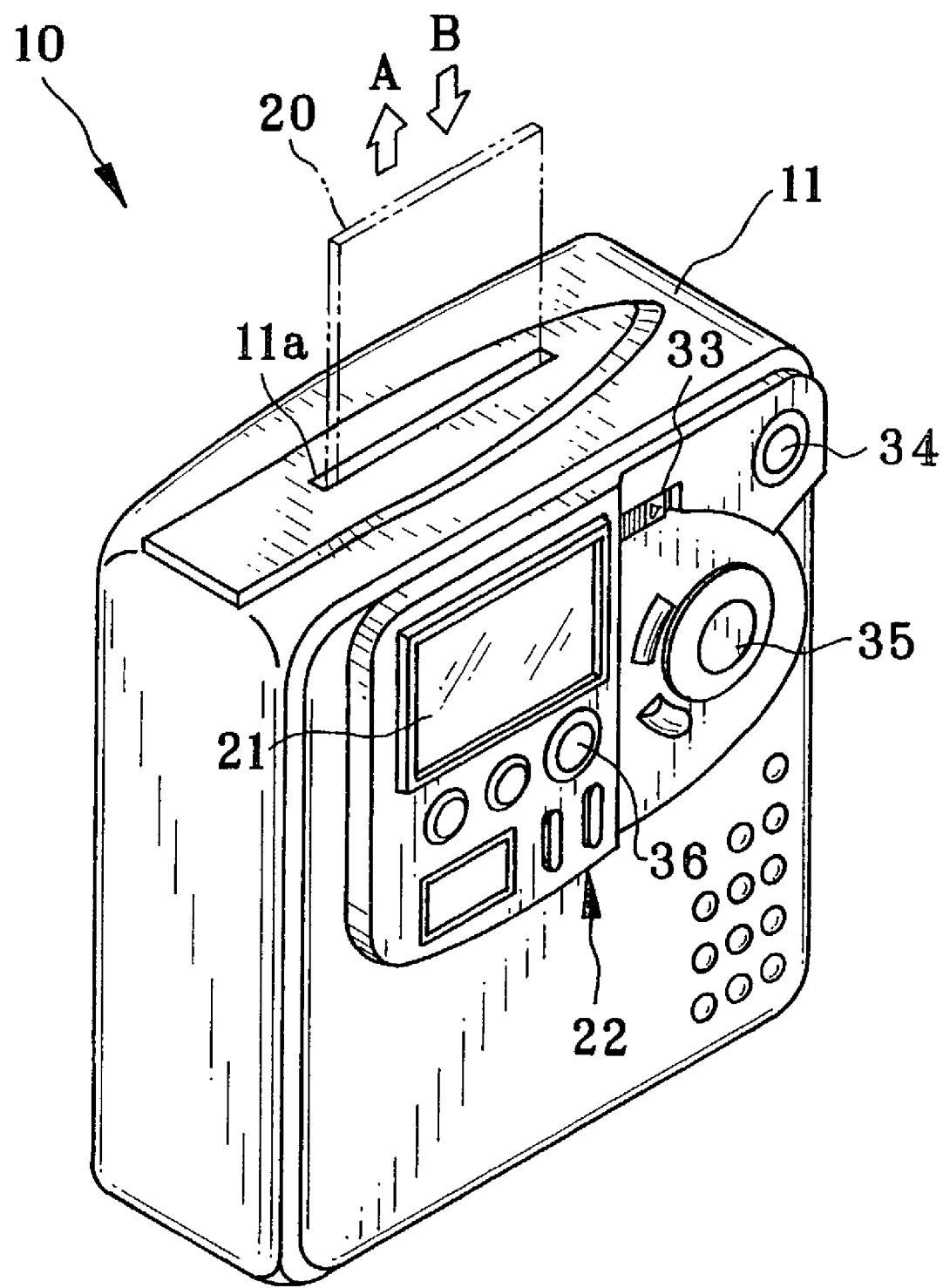
FIG. 2 is a rear perspective view of the digital camera shown in FIG. 1.

FIGS. 1 and 2 are perspective views showing a digital camera 10 having a built-in printer according to the present invention. A camera body 11 of the digital camera 10 is formed so as to have a flat-box shape, and the front thereof is provided with a taking lens 12, a shutter button 13, a cassette-chamber lid 14, an AF light-emitting window 15a and an AF light-receiving window 15b used for an automatic focusing device, an AE light-receiving window 16 for automatic exposure, a flash portion 17 and so forth. A top face of the camera body 11 is provided with a discharge mouth 11a through which an instant film 20 is moved in directions shown by arrows A and B. A rear face of the camera body 11 is provided with an LCD panel 21 and an operational panel 22.

A cassette chamber 25 is formed behind the cassette-chamber lid 14. Further, an optical head module 26 is disposed behind the cassette chamber 25. The optical head module 26 is moved in a direction shown by an arrow C by means of a head-module driver, which is not shown, when hard copy of image data is performed on the unexposed instant film 20 and when an image is read from the instant film on which the image is already recorded.

Figure 3A:
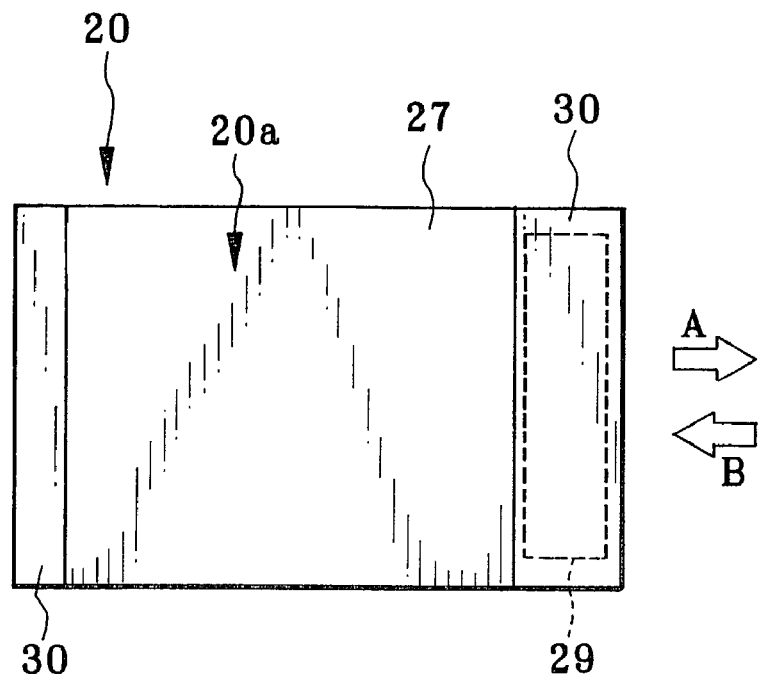
FIGS. 3A and 3B are explanatory illustrations showing an instant film.
Figure 3B:
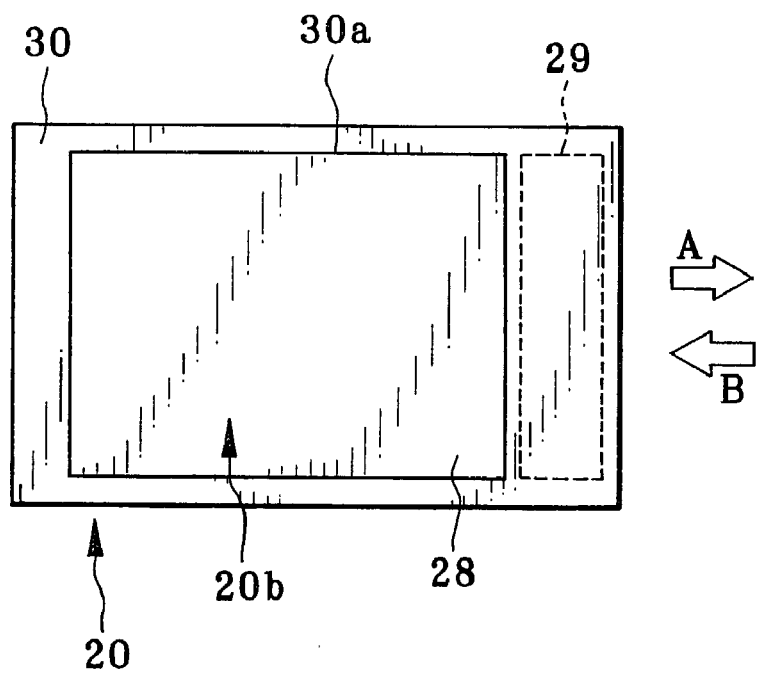

As shown in FIGS. 3A and 3B, the instant film 20 is a well-known mono-sheet type. The instant film 20 includes a photosensitive sheet 27 on which a latent image is formed by exposure, an image receiver sheet 28 to which a positive image is transferred, a developer pod 29 enclosing a developing solution, a trap material for capturing the surplus developing solution, a mask sheet 30 and so forth. The mask sheet 30 integrally combines the above-noted members and is formed with an opening 30a for externally observing the positive image, which appears on the image receiver sheet 28. As shown in FIG. 3A, a surface of the photosensitive sheet 27 is an exposure surface 20a of the instant film 20. As shown in FIG. 3B, a surface of the image receiver sheet 28 exposed through the opening 30a is an image recording surface 20b.

In FIGS. 1 and 2, an imaging section including a CCD image sensor, which is described later, is disposed behind the taking lens 12. A subject image photographed through the taking lens 12 is displayed on the LCD panel 21 in real time. The LCD panel 21 constitutes the so-called electronic viewfinder and is also used for reproducing the image data read out of a built-in memory. The operational panel 22 is provided with various operation switches of a power switch 33, a print key 34, a multi-operation key 35, a mode changing key 36 used for photographing, reproducing and printing, and so forth.

The cassette-chamber lid 14 is attached to the camera body 11 via a hinge 37 so as to be rotatable between a closed position where the cassette chamber 25 is light-tightly closed, and an open position where the cassette chamber 25 is opened. Upon rotating the cassette-chamber lid 14 to the closed position, a claw 38a integrally formed with a slider 38 engages with a hole 11b formed in the camera body 11 to lock the cassette-chamber lid 14 at the closed position. Upon sliding the slider 38 in this state, the engagement of the claw 38a and the hole 11b is released so that the cassette-chamber lid 14 is allowed to open.

The cassette chamber 25 is loaded with one of a film cassette 40 and a scan cassette 41. The film cassette 40 is used when the hard copy of the image data is performed. The film cassette 40 keeps the instant film 20 in an exposure position. Meanwhile, the scan cassette 41 is used when an image is read from the instant film on which the image is already recorded. The scan cassette 41 keeps the image-recorded instant film 20 in a predetermined read position.

Figure 4:
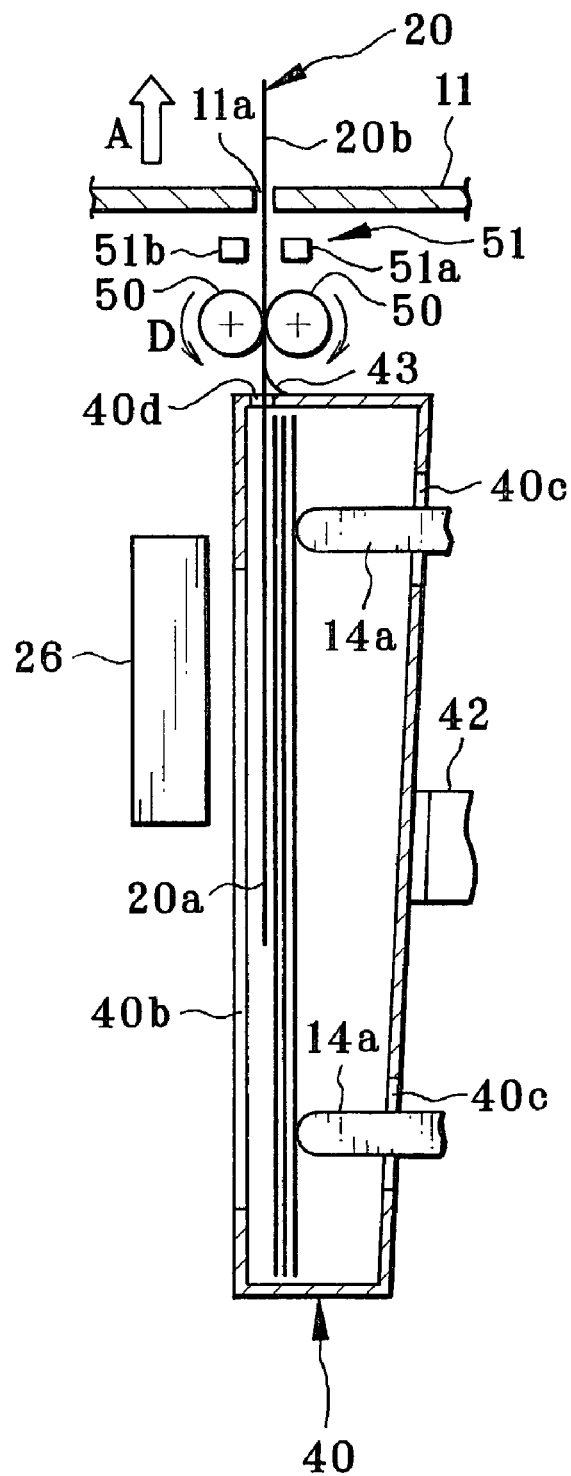
FIG. 4 is a partial section view showing a state in that a cassette chamber is loaded with a film cassette.
Figure 5:
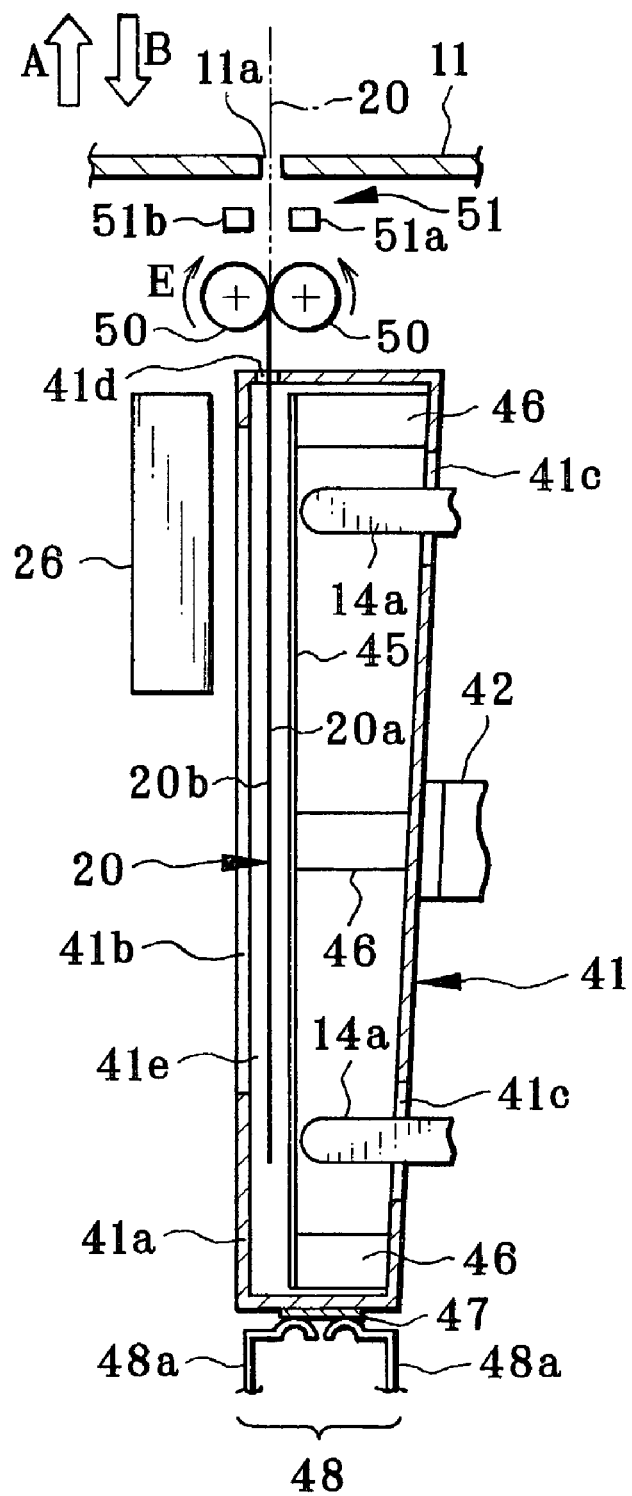
FIG. 5 is a partial section view showing a state in that the cassette chamber is loaded with a scanner cassette.

FIG. 4 shows a partial section of the digital camera 10 in a state that the cassette chamber 25 is loaded with the film cassette 40. FIG. 5 shows a partial section of the digital camera 10 in a state that the cassette chamber 25 is loaded with the scan cassette 41. Upon rotating the cassette-chamber lid 14 to the closed position, each of the cassettes 40 and 41 is placed at a predetermined position since the back thereof is pressed by a set spring 42.

The film cassette 40 comprises a plastic case 40a in which the unexposed instant films 20 are contained so as to be stacked such as shown in FIG. 4. An exposure aperture 40b is formed in a rear face of the case 40a to expose the exposure surface 20a of the instant film 20. Openings 40c are formed in a front face of the case 40a to insert a pair of press members 14a provided on the cassette-chamber lid 14. A slit 40d is formed in a top face of the case 40a to discharge the instant film 20. A light-shielding flap 43 light-tightly closes the slit 40d. Moreover, a bottom face of the case 40a is formed with a cut portion, which is not shown in the drawing and through which a claw of a film pushing member enters to discharge the exposed instant film 20 from the slit 40d.

When the cassette-chamber lid 14 is rotated to the closed position, the press member 14a enters the case 40a through the opening 40c to abut on the back of the instant film 20 stacked in the case 40a so that the instant film 20 is pressed toward the rear side of the case 40a. Owing to this, the exposure surface 20a of the instant film 20 is positioned at the exposure aperture 40b. Successively, the exposure surface 20a is exposed by the optical head module 26 in accordance with the image data. After that, the claw enters the case 40a through the cut portion to discharge the exposed instant film 20 from the slit 40d.

As shown in FIG. 5, the scan cassette 41 is constituted of a case 41a, a fixed guide plate 45, posts 46 and so forth. A read opening 41b is formed in a rear face of the case 41a to expose the image recording surface 20b of the recorded instant film 20. Openings 41c are formed in a front face of the case 41a to insert the press member 14a provided on the cassette-chamber lid 14. A top face of the case 41a is formed with a slit 41d through which the instant film 20 moves. A bottom face of the case 41a is provided with a distinction plate 47. Inside the case 41a, the fixed guide plate 45 is secured at a predetermined position by the posts 46. Meanwhile, a film passage 41e along which the instant film 20 moves through the slit 41d is formed between the case 41a and the fixed guide plate 45.

The distinction plate 47 is made of a metallic material and is disposed at a position facing a scan-cassette detection switch 48, which comprises a pair of switch segments 48a provided at the bottom of the cassette chamber 25. When the cassette chamber 25 is loaded with the scan cassette 41, the pair of the switch segments 48a are electrically connected by the distinction plate 47 to turn on the scan-cassette detection switch 48. A scan-cassette detection signal is inputted into a CPU, which is described later, to select a scan mode.

Spreading rollers 50 and a photointerruptor 51 are disposed between the respective cassettes 40, 41 and the discharge mouth 11a formed at the top of the camera body 11. As shown in FIG. 4, the spreading rollers 50 are rotated in a discharge direction shown by an arrow D when the hard copy of the image data is performed. The exposed instant film 20 discharged through the slit 40d is conveyed in a direction shown by an arrow A and is discharged from the discharge mouth 11a to the outside of the camera body 11. At this time, the developing solution spreads from the developer pod 29 (see FIG. 3) provided at a leading side of the instant film 20 so that an image is transferred to the image recording surface 20b.

Meanwhile, when an image is read from the image-recorded instant film 20, namely from the developed instant film 20, the spreading rollers 50 are rotated in a drawing direction shown by an arrow E so that the instant film 20 inserted from the discharge mouth 11a is drawn into the camera body 11. The drawn instant film 20 is inserted into the film passage 41e of the scanner cassette 41 through the slit 41d. The instant film 20 is finally drawn to a read position shown in FIG. 5. At this time, an edge of the instant film 20 is caught by the spreading rollers 50. After the image has been read by the optical head module 26, the spreading rollers 50 are rotated in the discharge direction shown by the arrow D similarly to the case performing the hard copy. Hence, the instant film 20 is discharged from the discharge mouth 11a.

The photointerruptor 51 comprises a light-emitting element 51a and a light-receiving element 51b, which are disposed at both sides of the conveyance passage of the instant film 20 so as to face each other. When the instant film 20 enters between the light-emitting element 51a and the light-receiving element 51b, light from the light-emitting element 51a is intercepted by the instant film 20 so that the light is prevented from entering the light-receiving element 51b. Upon this, the photointerruptor 51 is turned off to input a film detection signal into the CPU described later.

Figure 6A:
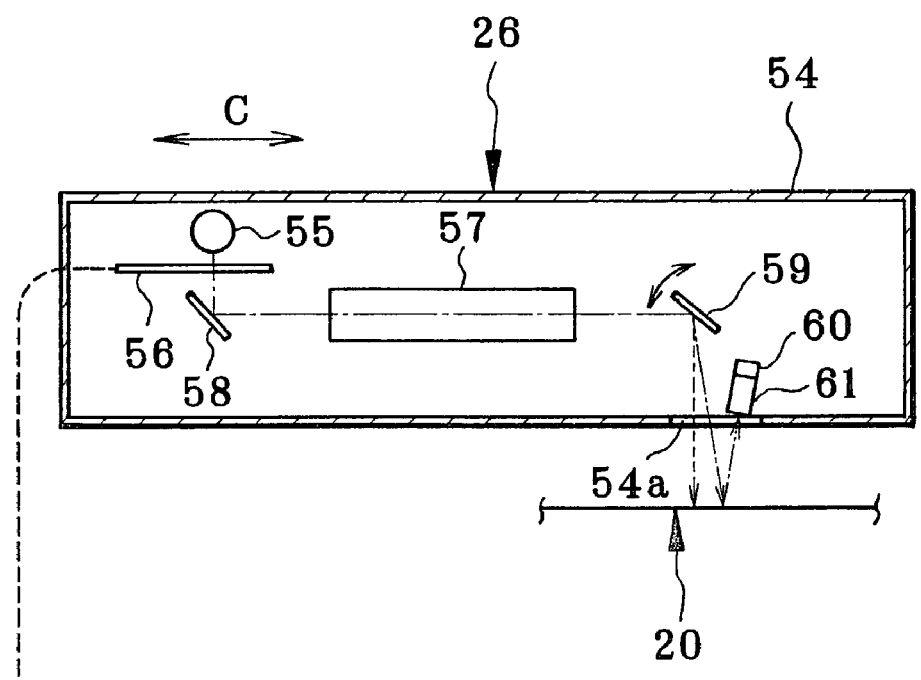
FIG. 6A is a schematic illustration showing a structure of an optical head module.
Figure 6B:
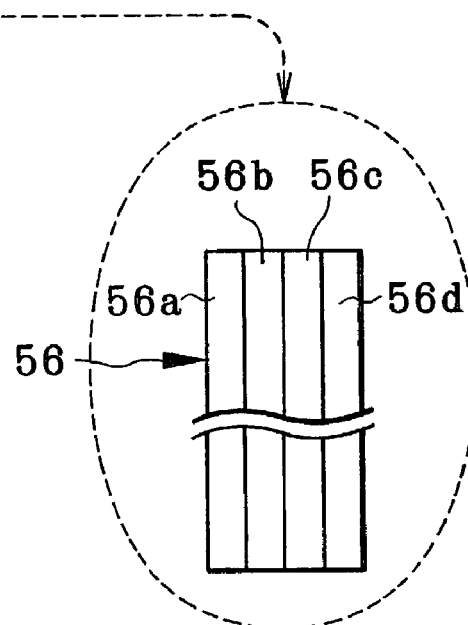
FIG. 6B is an enlarged view showing a color-separation filter.

As shown in FIG. 6A, the optical head module 26 is constituted of an optical head and an image reader. The optical head comprises a light-shielding case 54, a light source 55, a color-separation filter 56, a first graded-index-type optical fiber array 57, a first mirror 58, and a second mirror 59. The image reader comprises a line-CCD sensor 60 and a second graded-index-type optical fiber array 61. The optical head module 26 is moved by a head-module driver (not shown) in a direction shown by an arrow C. The light source 55 is a long fluorescent lamp disposed in a longitudinal direction (main-scanning direction) of the case 54. The light source 55 emits the white light including the respective colors of red(R), green(G) and blue(B).

As shown in FIG. 6A, the color-separation filter 56 includes a red-filter portion 56a for transmitting only the red light, a green-filter portion 56b for transmitting only the green light, a blue-filter portion 56c for transmitting only the blue light, and a transparent portion 56d for transmitting the whole white light emitted from the light source 55. A filter driver (not shown) moves the color-separation filter 56 in the direction shown by the arrow C to selectively set one of the portions 56a through 56d to an optical axis of the light source 55. The light emitted from the light source 55 passes through the color-separation filter 56 to become a printing light or a read light. The printing light includes one color of red, green and blue. In contrast, the read light includes the respective colors of red, green and blue. The graded-index-type optical fiber arrays 57 and 61 prevents the light of each pixel from expanding to the other pixel.

Each of the printing light and the read light from the light source 55 passes the first mirror 58, the first graded-index-type optical fiber array 57, and the second mirror 59. After that, each light is emitted from an opening 54a of the case 54 toward the instant film 20. A shifting mechanism (not shown) is provided for the second mirror 59. When the hard copy of the image data is performed, the second mirror 59 is set to an exposure position where the printing light is perpendicularly emitted to the instant film 20 such as shown by a broken line in FIG. 6A. When the image is read from the image-recorded instant film 20, the second mirror 59 is set to a read position where the read light is emitted so as to be inclined relative to the instant film 20 by a predetermined angle, such as shown by a one-dotted line in FIG. 6A.

The image reader comprising the line-CCD sensor 60 and the second graded-index-type optical fiber array 61 is disposed so as to be tilted by a predetermined angle. This reason is that the image reader receives the read light reflected by the instant film 20 when the image is read from the image-recorded instant film 20.

FIG. 7 is a block diagram showing a circuit structure of the digital camera 10 having the built-in printer. A CPU 65 totally administers electrical operations of the digital camera 10 to execute signal processing and control of each section in accordance with input signals, which are sent from the various operation switches of the operational panel 22, the scan-cassette detection switch 48, the photointerruptor 51 and so forth.

To the CPU 65, are connected the LCD panel 21, an optical head 66, the line-CCD sensor 60, the color-separation filter 56, the spreading roller 50, and the second mirror 59 via an LCD driver 67, an optical-head driver 68, a line-CCD controller 69, a filter driver 71, a spreading-roller driver 72, and a shifting mechanism 73 respectively. In addition, a CCD image sensor 78, a main memory 80, an external terminal 82, an external memory 84, and an external apparatus 86 are connected to the CPU 65 via a CCD driver 77, a memory controller 79, a NTSC encoder 81, an external-memory I/F 83, and a communication I/F 85 respectively. A film conveying section 87 is also connected to the CPU 65.

The CCD image sensor 78 is disposed behind the taking lens 12 and has a photoelectric surface on which micro color filters of R, G and B are arranged in matrix. An optical subject image is formed on the photoelectric surface of the CCD image sensor 78 through the taking lens 12. The optical subject image is converted into electrical image signals of the respective colors by means of the CCD driver 77. The electrical image signal is outputted and is converted into a digital signal by an A-D converter 89 after amplifying the image signal by an amplifier 88. Predetermined image processing is executed for the digital signal. Meanwhile, the line-CCD sensor 60 also has a photoelectric surface on which micro color filters of R, G and B are arranged. An optically-read image formed on the photoelectric surface of the line-CCD sensor 60 is converted into electric image signals of the respective colors by means of the line-CCD controller 69. After that, the electric image signal is converted into a digital signal for which predetermined image processing is executed.

The CPU 65 accesses the main memory 80 via the memory controller 79 for reading and writing the necessary data. The main memory 80 stores the image data, which is obtained by performing the predetermined image processing for the digital signal, relative to each frame. For instance, the main memory 80 has storage capacity in which it is possible to store the image data corresponding to fifty frames. Further, the CPU 65 is adapted to access the external memory 84 via the external-memory I/F 83 for reading and writing the image data. Moreover, it is selectable to output the image data to the external apparatus 86, which is a personal computer for example, via the communication I/F 85.

On the basis of the image data, the LCD driver 67 drives the LCD panel 21 provided at the rear face of the camera body 11. The LCD panel 21 continuously displays the subject image under a photographic mode. The LCD panel 21 also displays the image data read from the main memory 80 or the external memory 84 under a playback/print mode. Further, the LCD panel 21 displays the data of the image read from the instant film 20 under the scan mode.

The NTSC encoder 81 produces a picture signal corresponding to a composite signal of NTSC system, on the basis of the image data. The picture signal is outputted to the external terminal 82. If a home television is connected to the external terminal 82, it is possible to watch the continuous subject image photographed by the CCD image sensor 78, the image read from the respective memories 80 and 84, and the image read from the instant film 20.

Figure 8:
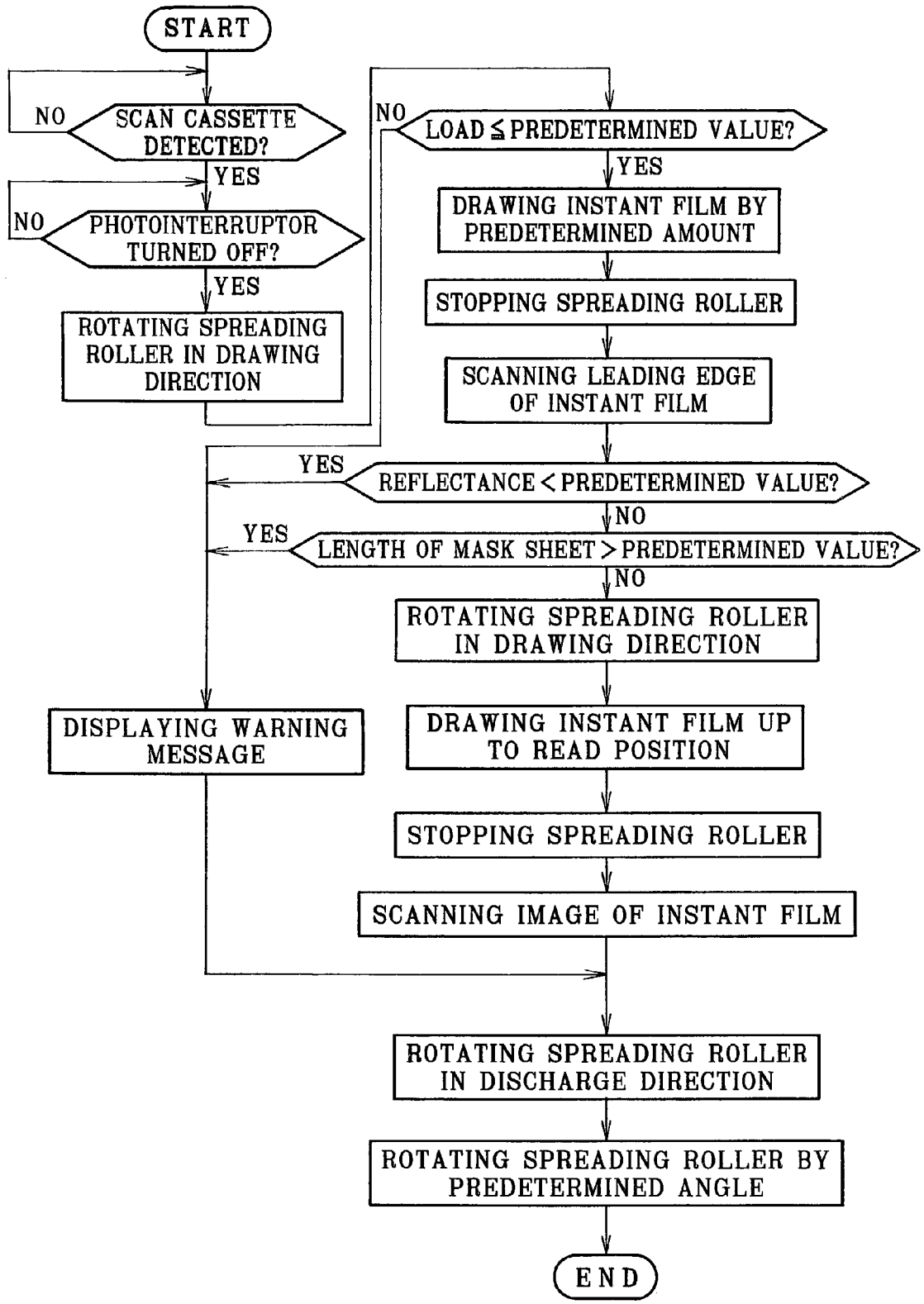
FIG. 8 is a flow chart showing a sequence for reading an image under a scan mode.

Successively, an operation of the above structure is described below, referring to a flow chart shown in FIG. 8. When the image is read from the image-recorded instant film 20, the scan cassette 41 is loaded into the cassette chamber 25 first. Upon loading the scan cassette 41, the distinction plate 47 electrically connects the pair of the switch segments 48a provided in the cassette chamber 25. Owing to this, the scan-cassette detection switch 48 is turned on so that the scan cassette 41 is detected to set the scan mode.

The image-recorded instant film 20 from which the image is read is inserted through the discharge mouth 11a of the camera body 11 so as to position the developer pod 29 at an upper side and so as to turn the image recording surface 20b to the optical head module 26. When the photointerruptor 51 is turned off by the inserted instant film 20, the spreading roller 50 starts to rotate in the drawing direction. When the instant film 20 is further inserted, the spreading rollers 50 in rotating catch the edge of the instant film 20 to draw it into the camera body 11.

At this time, in case a drive load of the spreading rollers 50 exceeds a predetermined value due to simultaneous insertion of the instant films 20 caused by mistake, the LCD panel 21 displays a warning message and the spreading rollers 50 are rotated in the discharge direction to return the instant films 20.

When the drive load of the spreading rollers 50 is the predetermined value or less, the instant film 20 is drawn by a predetermined length up to a position where the edge thereof faces the optical head module 26. Then, the spreading rollers 50 are stopped and scanning is performed for the leading portion of the instant film 20 by the optical head module 26. At this time, it is judged that the face of the instant film 20 is correctly directed and the inserting direction thereof is correct.

In a case that reflectance of the instant film 20 is less than a prescribed value, this case means that the exposure surface 20a is turned to the optical head module 26. Thus, it is impossible to read the image. In this case, the LCD panel 21 displays a warning message, and at the same time, the spreading rollers 50 are rotated in the discharging direction to discharge the instant film 20. Meanwhile, in a case that a length of the mask sheet 30 is longer than a prescribed length regarding the insertion direction (longitudinal direction) of the instant film 20, this case means that the instant film is inserted in an upside-down state. Thus, it is impossible to read the image. Also in this case, the LCD panel 21 displays a warning message, and at the same time, the spreading rollers 50 are rotated in the discharging direction to discharge the instant film 20.

When the reflectance of the instant film 20 is more than the prescribed value and the length of the mask sheet 30 is shorter than the prescribed length, the spreading rollers 50 are rotated again in the drawing direction to draw the instant film 20 up to the read position. When the instant film 20 reaches the read position, the spreading rollers 50 are stopped to perform the image scanning with the optical head module 26. The read image is stored in the main memory 80 as the image data. After completing the image scanning, the spreading rollers 50 are rotated in the discharging direction to discharge the instant film 20 through the discharge mouth 11a. The spreading rollers 50 are rotated by a predetermined angle and are stopped.

When the hard copy of the image data is performed, first of all, the cassette chamber 25 is loaded with the film cassette 40 containing the unexposed instant film 20. Successively, the mode changing key 36 provided on the operational panel 22 is operated to set the print mode. After the desired image data has been selected with the multi-operation key 35, the print key 34 is depressed. Upon depressing the print key 34, the optical head module 26 is moved to perform the exposure in accordance with the image data in a three-color frame-sequential manner. After the hard copy, the instant film 20 is discharged through the discharge mouth 11a formed in the top face of the camera body 11. In this way, a full-color image is recorded on the instant film 20. In the present embodiment, pixel density of the optical head is identical with that of the line CCD sensor. Thus, the image exposed on the unexposed instant film has resolution which is substantially same with the image obtained by reading the exposed instant film.

Figure 9:
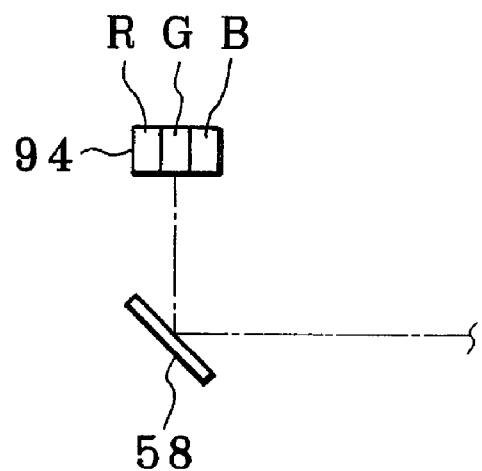
FIG. 9 is a schematic illustration showing a light source of the optical head module in a second embodiment.
Figure 10:
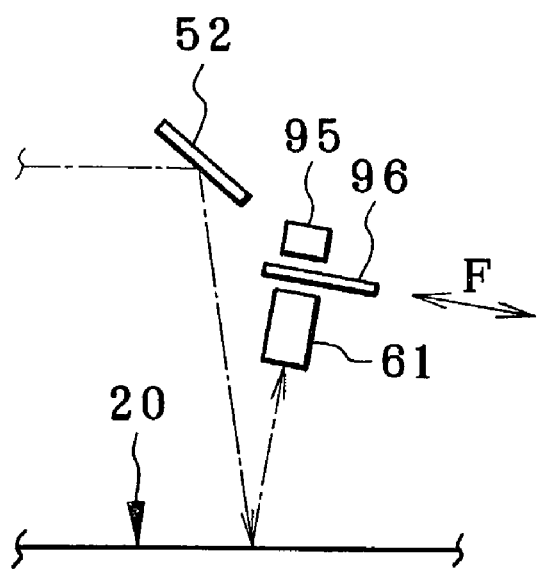
FIG. 10 is a schematic illustration showing an image reader of the optical head module in a third embodiment.

In the above embodiment, the fluorescent lamp emitting the white light is used as the light source. However, as shown in FIG. 9, an LED array 94 emitting the respective lights of R, G and B may be used as the light source. In this case, it is possible to remove the color-separation filter, which is disposed at the optical axis between the light source and the first mirror 58. In the foregoing embodiment, the color line-CCD sensor is used when reading the image from the image-recorded instant film. However, as shown in FIG. 10, a monochromatic line-CCD sensor 95 may be used. In this case, a filter 96 is disposed between the line-CCD sensor 95 and the second graded-index-type optical fiber array 61. The filter 96 is moved in a direction shown by an arrow F at need to read the image every color of R, G and B.

In the above embodiment, the image data is obtained by reading the image-recorded instant film. However, the instant film is not exclusive. The image data may be obtained from the other medium on which the image is already recorded. As to the medium, there are a photo print, a print sheet, a recording sheet and so forth. In this case, the scan cassette contains one of the photo print, the print sheet and the recording sheet instead of the image-recorded instant film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera including an imaging device for converting an optical image into image data, a cassette chamber loaded with a film cassette containing unexposed instant films, an optical head moving on a parallel with an exposure surface of said instant film to expose said exposure surface in accordance with said image data, and a spreading-roller pair for conveying said instant film exposed by said optical head toward a discharge mouth and for spreading developer, said digital camera comprising:

removable medium holding means for setting an image recording medium, on which an image has been printed, to a predetermined position in said cassette chamber;

a light emitting device moving on a parallel with an image recording surface of said image recording medium, said light emitting device irradiating a read light for reading the image recorded on said image recording medium; and an image reader moving in synchronism with said light emitting device to scan said image recording surface, said image reader receiving the read light reflected by said image recording surface in scanning to read said recorded image.

2. A digital camera according to claim 1, wherein said image recording medium is the developed instant film.

3. A digital camera according to claim 1, wherein said optical head is also used as said light emitting device.

4. A digital camera according to claim 3, wherein said image reader comprises a line-CCD sensor and is unified with said optical head.

5. A digital camera according to claim 4, wherein said line-CCD sensor receives the read light via a graded index type optical fiber array.

6. A digital camera according to claim 1, wherein said medium holding means is a scan cassette having an identical shape with said film cassette, said scan cassette being loaded into said cassette chamber instead of said film cassette when reading the image of said image recording medium, and said scan cassette keeping said image recording surface of said image recording medium so as to face said optical head.

7. A digital camera according to claim 6, wherein said scan cassette includes:
 a case for containing said image recording medium;
 a guide plate fixed inside said case;
 a slit formed in said case;
 a container space formed between said case and said guide plate, said image recording medium being inserted into said container space through said slit; and
 a read opening formed in front of said container space and for exposing said image recording surface of said image recording medium.

8. A digital camera according to claim 7, further comprising:
 a distinction member for identifying said scan cassette; and
 cassette distinction means provided in said cassette chamber and for detecting said distinction member, said cassette distinction means distinguishing said film cassette and said scan cassette in accordance with the detection of said distinction member, and said cassette distinction means allowing to read said image only when said cassette chamber is loaded with said scan cassette.

9. A digital camera according to claim 8, wherein
 said distinction member is made of a metallic material and is attached to the bottom of said scan cassette;
 said cassette distinction means is a pair of switch segments and is disposed at a position confronting said distinction member, said pair of the switch segments being electrically connected by said distinction member to distinguish said scan cassette.

10. A digital camera according to claim 8, further comprising:
 medium detection means disposed between said discharge mouth and said spreading-roller pair, said medium detection means detecting said image recording medium inserted through said discharge mouth;
 wherein said spreading-roller pair is rotated in a reverse direction to convey said image recording medium into said scan cassette when said medium detection means detects said image recording medium and when said cassette distinction means detects said scan cassette.

11. A digital camera according to claim 10, wherein said medium detection means is a photointerruptor comprising a light emitting element and a light receiving element, which are disposed at both sides of said image recording medium so as to face each other.

12. A digital camera according to claim 11, wherein a warning is given if a drive load of said spreading-roller pair exceeds a predetermined value when conveying said image recording medium into said scan cassette, and at the same time, said spreading-roller pair is normally rotated to discharge said image recording medium through said discharge mouth.

13. A digital camera according to claim 11, wherein when a leading portion of said image recording medium reaches an opposite position of said optical head, said image recording medium is stopped and said leading portion is scanned, a warning being given if a reflectance of said leading portion is lower than a predetermined value, and at the same time, said spreading-roller pair being normally rotated to discharge said image recording medium through said discharge mouth.

14. A digital camera according to claim 11, wherein if an area of said image recording medium where a reflectance is higher than a predetermined value is longer than a prescribed length in a conveyance direction, it is judged that said image recording medium is not the developed instant film so that a warning is given, and at the same time, said spreading-roller pair is normally rotated to discharge said image recording medium through said discharge mouth.

15. A digital camera according to claim 11, wherein said optical head has pixel density identical with said line CCD sensor, and thereby the image to be taken on said unexposed instant film has resolution which is identical with the image obtained by reading said image recording medium.

* * * * *